FIG. I

INVENTORS
F.D. JONES, J.D. WILKINS &
C.S. MORRISON

BY *W.A. Murray*

ATTORNEY

FIG. 2

INVENTORS
F.D. JONES, J.D. WILKINS &
C.S. MORRISON
BY W.A. Murray
ATTORNEY

United States Patent Office 3,609,948
Patented Oct. 5, 1971

3,609,948
CROP HARVESTER
Frank D. Jones, Moline, James D. Wilkins, Geneva, and Charles S. Morrison, Moline, Ill., assignors to Deere & Company, Moline, Ill.
Continuation of application Ser. No. 333,263, Dec. 19, 1963, which is a continuation of application Ser. No. 86,934, Feb. 3, 1961. This application June 8, 1966, Ser. No. 562,416
Int. Cl. A01d 45/02
U.S. Cl. 56—14.2     52 Claims

ABSTRACT OF THE DISCLOSURE

A row crop harvester adapted to be mounted on a crop treating unit and including a transverse supporting structure extending across a plurality of crop rows and a transverse conveyor feeding harvested crops inwardly to the treating unit, a plurality of crop harvesting units adapted for support on the transverse structure at different transverse locations and having drive mechanism connected to and shiftable axially with respect to a main transverse drive shaft, with at least one of the units being supported on a transverse horizontal pivot and having an hydraulic cylinder connected thereto for vertically adjusting the unit.

---

This is a continuation of application Ser. No. 333,263, filed Dec. 19, 1963, which is a continuation of application Ser. No. 86,934, filed Feb. 3, 1961, for a corn harvester both of which are now abandoned.

This invention relates to a crop harvester and more particularly to a corn harvester which is adapted to be mounted on the forward end of a mobile crop treating unit.

In the past, there has been a conventional spacing between rows of corn. Consequently the corn planters as well as the harvesting mechanism used for harvesting corn were designed to accommodate a fixed width between adjacent rows of corn. In recent times there has been considerable investigation on the merits of using various width rows in corn planting. It has been determined that various conditions may enter into the desirability of planting corn in various width rows. For example, the climatic conditions of a certain area may make it more practical to plant corn in rows closer to one another than in other localities. Similarly, the soil fertility, the type of seed, the type of fertilizer used, all may enter into the desirability of narrowing or expanding the distance between the rows of corn. In some instances corn planted in fields adjacent to one another will be planted in different row widths.

It is desirable therefore, and it is the main object of the present invention to provide a new and novel type of crop harvester having multiple row units which are adapted for adjustment transversely so that the row units may be adapted for various width rows.

It is also an object of the present invention to incorporate in the drive mechanism for the multiple row units a suitable adjustment so that the drive mechanism may also be adjusted to accommodate movement of the row units transversely in order to operate on crop rows spaced at various widths from one another.

Specifically it is the object of the present invention to provide a crop harvester, which for purposes of illustration will be shown as a corn harvester, adapted to be mounted on the forward end of a mobile crop treating unit which is transported on transversely spaced wheels. The crop harvester will include a centrally and forwardly directed conveyor which discharges at its rear end into the crop treating unit and which has a pair of transversely extending conveyors extending to opposite sides of the crop treating unit and generally forwardly of the traction wheels. Extending forwardly from the transverse conveyors are a multiple number of crop row units, each having a gathering and harvesting mechanism which gathers and harvests the crop from the respective row as the harvester advances. Each row unit has a forward lower end and an upper rear end which is disposed above a transverse conveyor and permits the harvested crop to gravitate into the conveyor. In operation the transverse conveyors feed into the central fore and aft extending conveyor which in turn feeds the crop to the crop treating unit. For purposes of illustration, the crop treating unit will be a conventional type combine. It should be understood, however, that any type of crop treating unit would be satisfactory.

The transversely spaced transport wheels on the combine are normally spaced so as to move outside of a pair of adjacent rows of corn. It is the purpose also of the present invention to provide at least four row crop units, two of which are inboard of the wheels and gather the crops from the rows between the transport wheels and two of which are outboard of the wheels and gather the crop from the rows just outside of the transport wheels. It will, however, become rather obvious to those skilled in the art that the present structure, while shown to harvest crops from four rows, could be readily modified to gather crops from any number of rows by merely adjusting the transverse conveyors and its associated driving mechanism and adding or subtracting row units as desired.

It is still a further object of the present invention to provide means between the crop treating unit and the forwardly positioned row units for raising and lowering the row units in unison and also to provide means between the supporting structure and the individual row units so that the row units outboard of the main traction wheels will be capable of being raised and lowered independently.

Other objects and advantages of the present invention will become apparent to those skilled in the art as the nature of the invention is better understood from the following description and as shown in the accompanying drawings.

Figure 1:
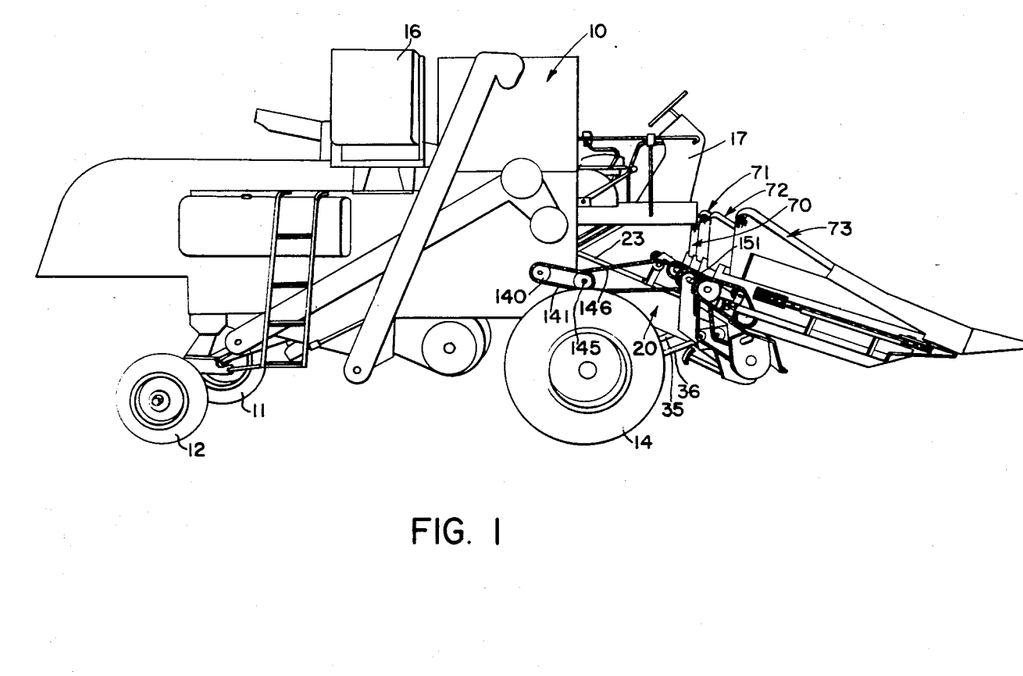
FIG. 1 is a side perspective view of a combine and the harvesting mechanism of the present invention.

Referring first to FIG. 1, there is provided a combine or crop treating unit 10. The crop treating unit is of a mobile nature being supported at its rear by a pair of steerable wheels 11, 12 and at its front by a pair of transversely spaced and large traction wheels 13, 14. In this respect, it should be noted that while the crop treating unit is shown as a combine, it could be of any type of crop treating unit and it could be mounted on any type of mobile frame. The combine 10 is of a conventional type and includes a front wall 15 with a centrally located and forwardly opening crop inlet, not shown. The combine 10 has its own main power source or engine not shown, but indicated in its location by the radiator grill 16. The combine 10 has an operator station 17 and is conventional in most other respects in its mechanism and in its operation.

The crop harvester mechanism includes a T-shaped conveyor housing structure which includes a forwardly directed centrally locating stem section 20 discharging at its rear end into the crop inlet of the combine and a pair of transverse sections 21, 22 which extends in opposite directions from the forward end of the stem section 20 and forms the bar of the T. The sections 21, 22 are disposed forwardly of and extend outwardly of the transversely spaced traction wheels 13, 14. The stem section 20 is of box-like construction having a laterally disposed upper panel 23, and vertically disposed side panels 24, 25. The floor of the stem section 20 is a unitary panel 26 formed to define a pair of transversely spaced auger troughs 27, 28. Seated in the auger troughs 27, 28 is a pair of augers 29, 30 respectively. The augers 29, 30 feed harvested crops rearwardly to the forwardly disposed crop inlet at the forward end of the combine 10. A hood, here indicated in its entirety by the reference numeral 31, is provided on the rear end of the stem section 20 to guide the material into the crop inlet. A cross beam 32 is welded to the undersurface and at the forward end of the stem section 20 and supports at opposite ends thereof a pair of brackets 33, 34 which are adapted to receive hydraulic rams 35, 36 respectively which operate to raise and lower the entire crop harvester.

The transverse sections 21, 22 are also U-shaped in cross section and may be referred to as the harvesting table since they serve as auger troughs for transverse augers, later to be described. The sections 21, 22 include front upright walls 40, 40a, and 41 respectively and rear upright walls 42, 42a, and 43 respectively. The transverse sections 21, 22 are generally identical, particularly in cross section, and consequently detailed description will be limited to the left transverse section 21. The exact manner of difference or distinction between the left and right transverse sections 21, 22 will later be discussed.

Figure 7:
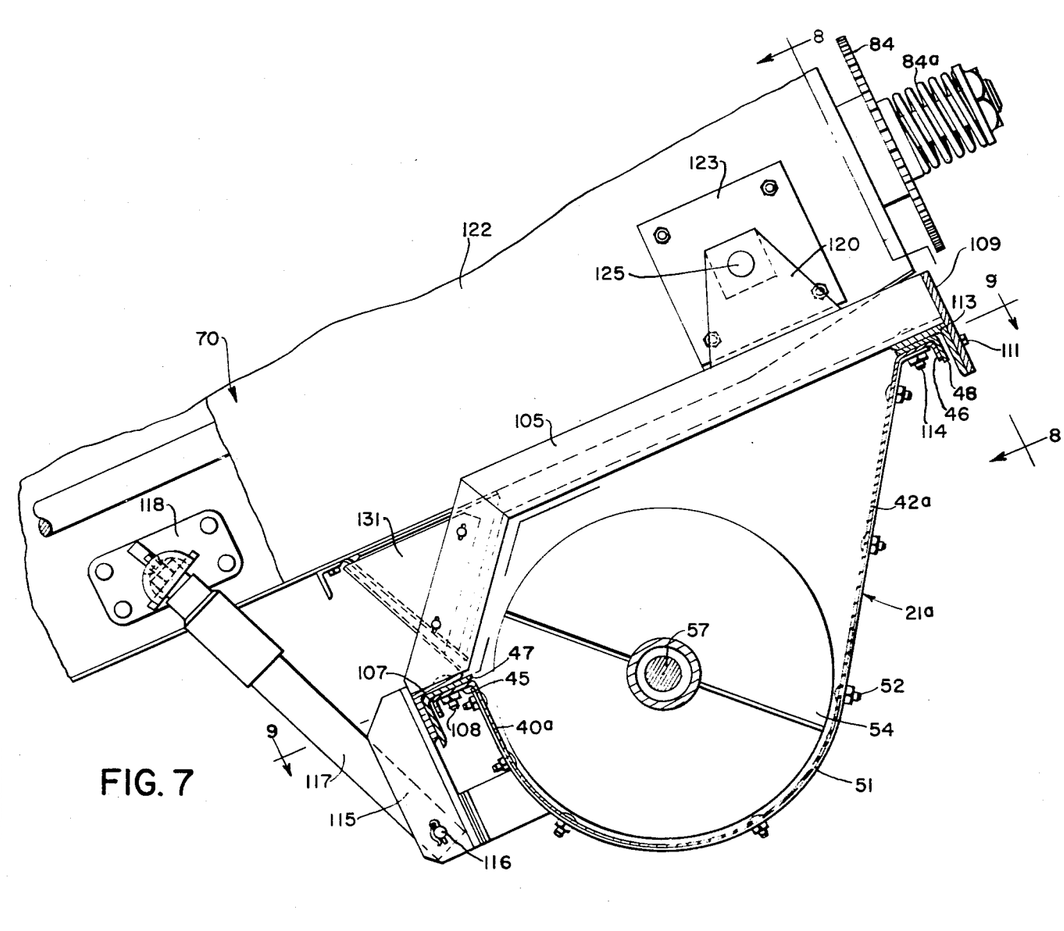
FIG. 7 is an enlarged vertical sectional view taken just inwardly of the outer left end of the transverse conveyor section.
Figure 8:
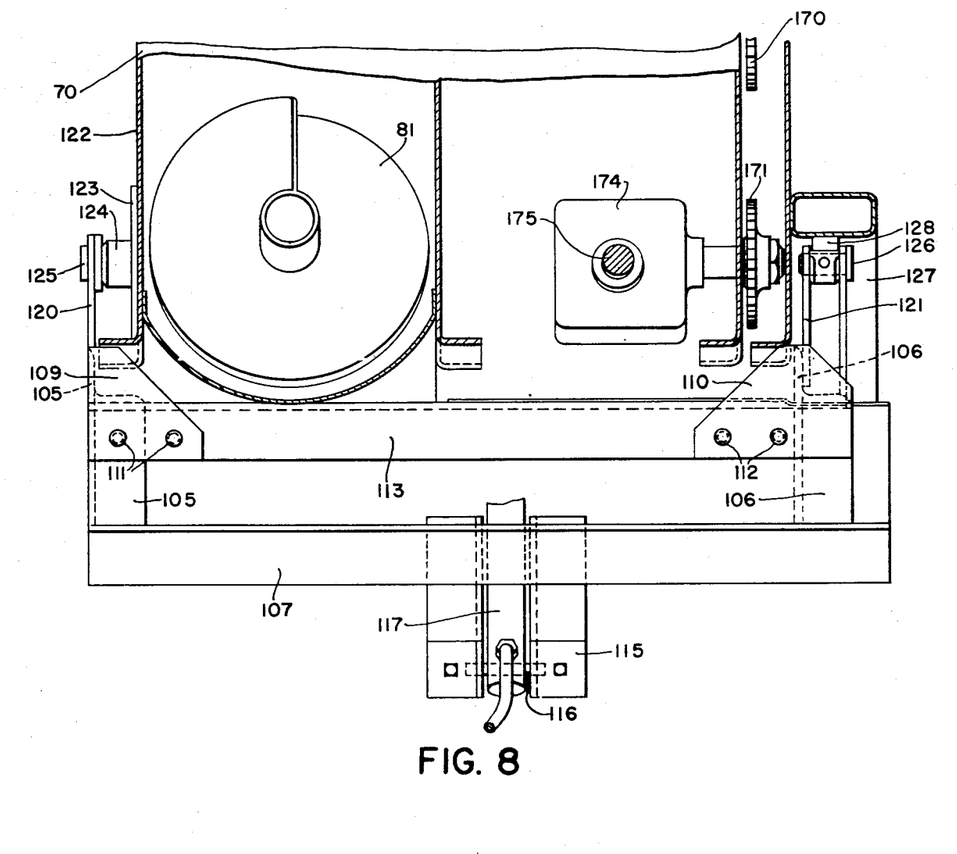
FIG. 8 is a sectional view taken substantially along the line 8—8 of FIG. 7.
Figures 9, 10:
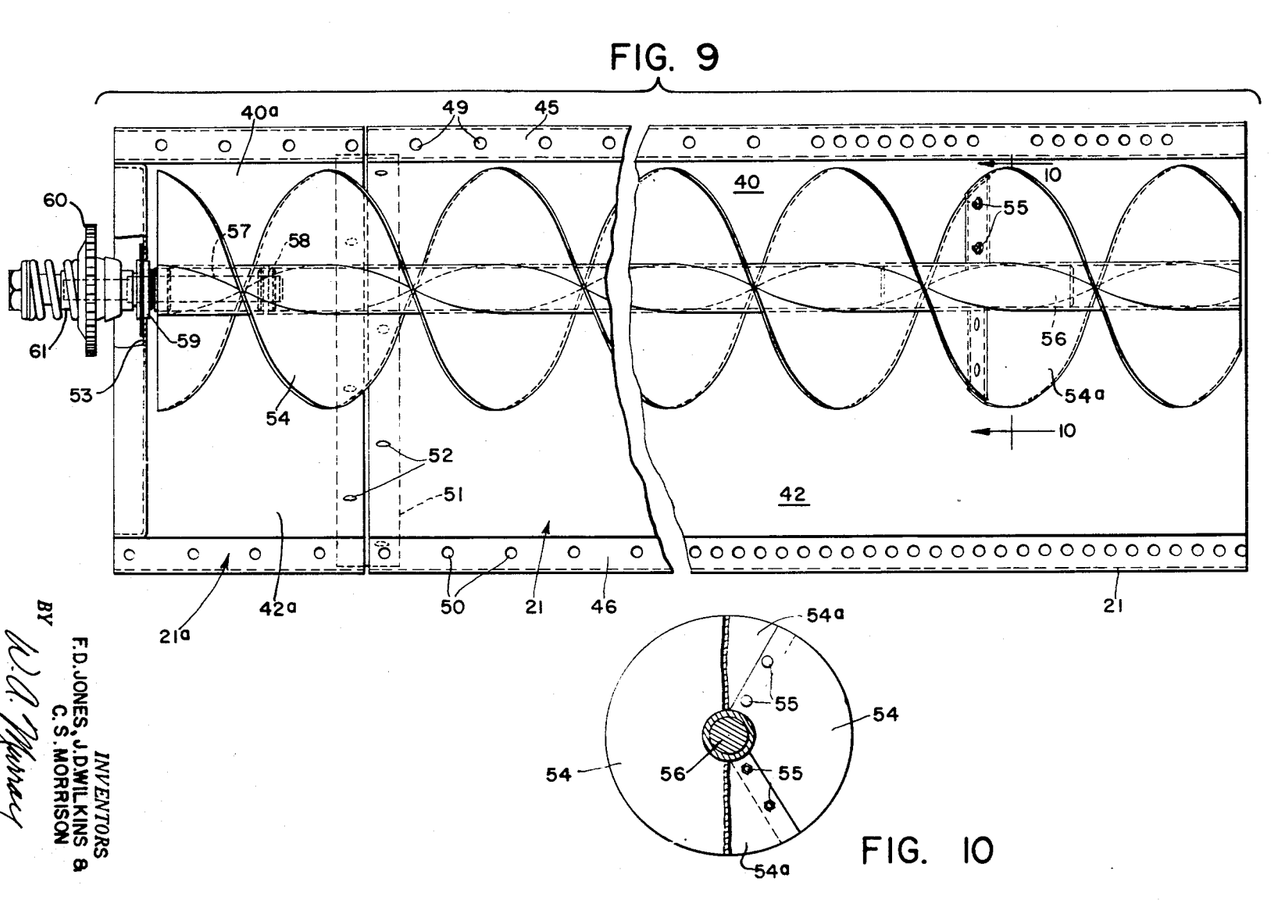
FIG. 9 is a sectional view taken substantially along the line 9—9 of FIG. 7.
FIG. 10 is a sectional view taken along the line 10—10 of FIG. 9.

Referring now to FIGS. 7, 8, and 9, the front wall 40a has an upper edge and forwardly directed flange 45 and the rear wall 42a terminates in an upper and rearwardly extending flange 46. Welded or otherwise fixed to the flanges 45, 46 are transversely extending angle iron mounting rails or beams 47, 48. The mounting rails or beams 47, 48 and the flanges 45, 46 are provided with a series of transversely spaced openings 49, 50 respectively. The openings 49, 50, as will later become apparent, serve as the means for adjustably mounting the individual row units transversely relative to the conveyor sections 21, 22. The openings 49, 50 are spaced so as to permit selective and various transverse positionings of the row units on the conveyor section 21.

Figure 6:
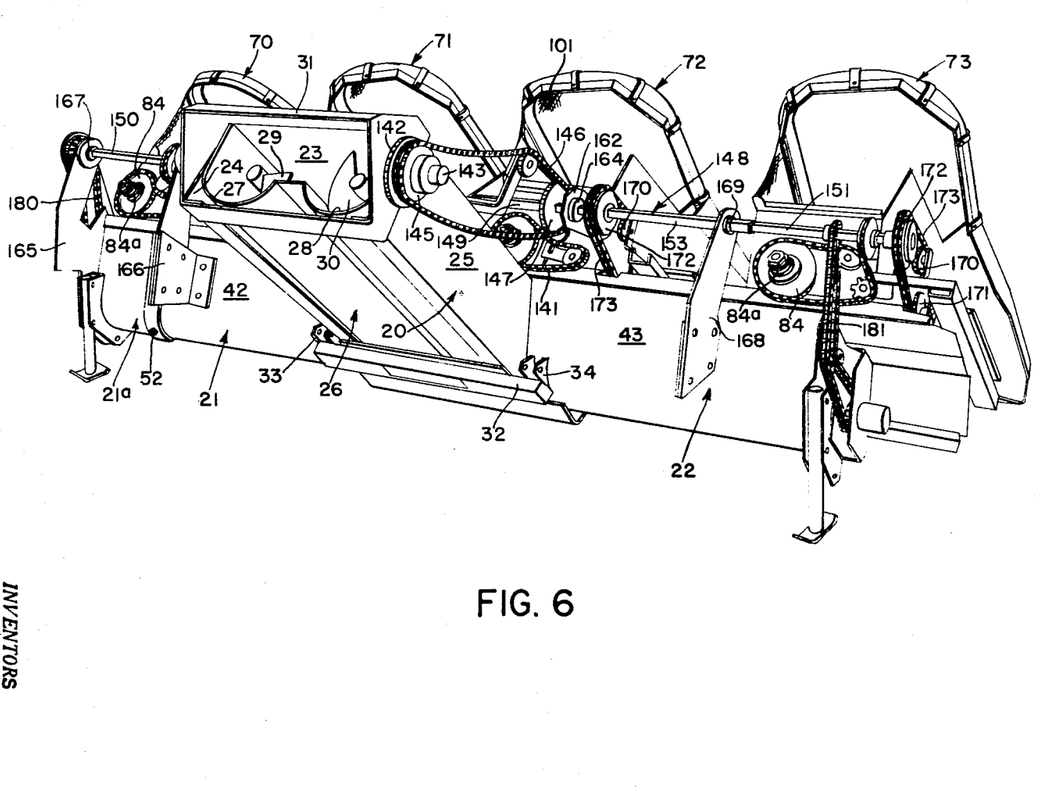
FIG. 6 is a rear perspective view taken slightly to one side of the entire harvester mechanism.

Referring now to FIGS. 6 and 9, there is provided on the left end of the transverse conveyor section 21 an extension 21a. The housing or section 21a is U-shaped in cross section having, as previously mentioned, a front wall 40a and a rear wall 42a which serve as transverse continuations of the walls 40, 42 respectively. The adjacent edges of the walls 40, 42, 40a and 42a are in abutting position and are rigidly fixed to one another by means of an underlying panel 51 and a series of bolts 52. The outer end of the extension 21a is closed by an end plate or bulkhead 53. The bulkhead 53 supports the outer end of a transverse conveyor means composed of an outer main double auger section 54 and an inner double auger extension 54a. The flights of the auger section 54 and the flights of the extension 54a slightly overlap and are bolted at 55 to one another. The central shaft for the auger 54 is hollow as likewise is the main driveshaft for the auger extension 54a. Consequently a short length of shaft 56 is disposed to extend in the adjoining ends of the auger conveyor 54 and its extension 54a to operate as a pilot for maintaining axial alignment of the auger sections. Suitable means, not shown, are provided to prevent axial slippage of the shaft 56 relative to the auger 54 and its extension 54a. The outer end of the central shaft portion of the auger 54 has inserted therein a short stub shaft 57 which is pinned at 58 to the hollow auger drive shaft. The short stub shaft 57 is journaled at 59 in the bulkhead 53 and has fixed at its outer end a chain sprocket 60. A suitable outer slip clutch, indicated in its entirety by the reference numeral 61, is provided adjacent the hub of the sprocket 60. A shield or guard 62 (FIG. 3) is provided to cover drive means at the end of the shaft 57. The inner end of the auger is supported by the floors of the housings 21, 21a.

Figure 2:
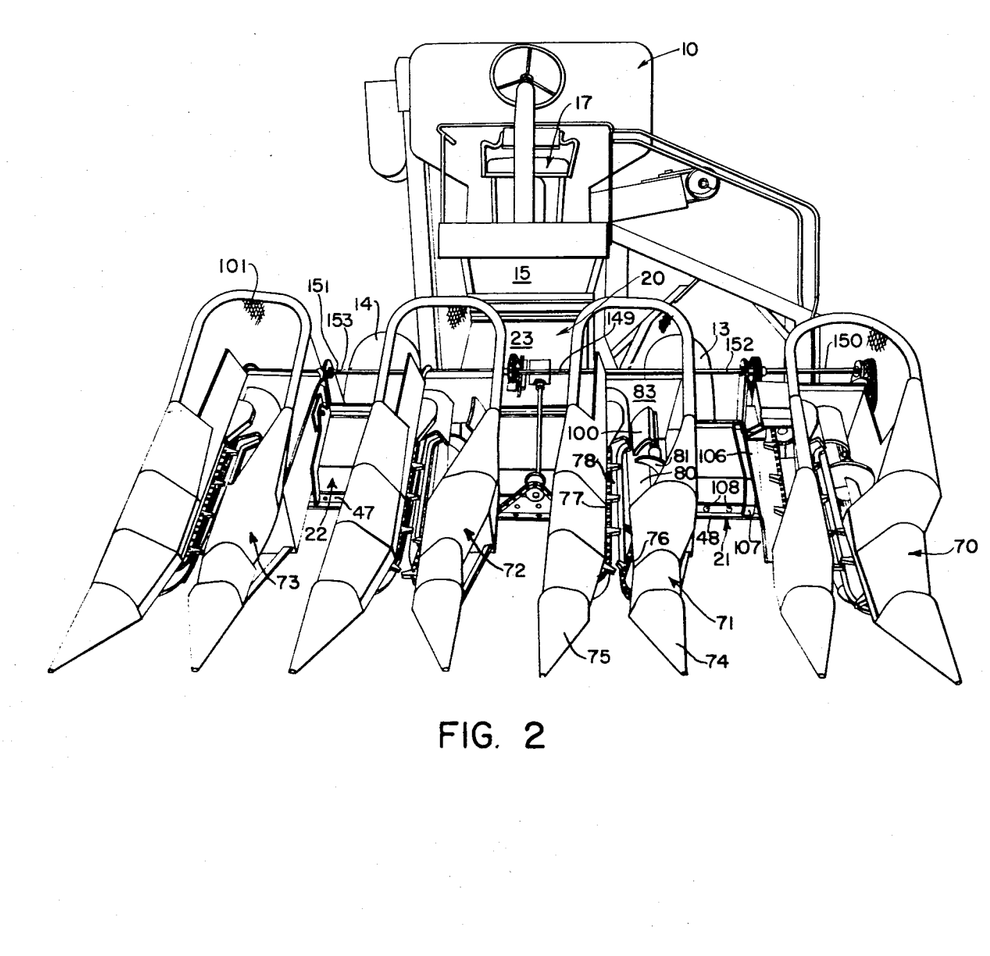
FIG. 2 is a front perspective view of the harvester and combine shown in FIG. 1.

Four row crop units 70, 71, 72, and 73 extend forwardly from the transverse conveyor sections 21, 22. The row units 70, 71, 72, and 73 are spaced so as to harvest corn on four adjacent rows of corn. As may be seen from viewing FIG. 2, the inner units 71, 72 are inboard of the transversely spaced traction wheels 13, 14 and the outer row units 70, 73 are outboard of the traction wheels 13, 14. Each of the row units 70, 73 is identical although there is distinction in the manner of mounting the units on the transverse conveyor sections 21, 22. Consequently description shall be given in detail only relative to the unit 71. However, reference numerals, where convenient, for identical parts on the other row units will be properly placed.

The crop row unit 71 has forwardly disposed gathering points 74, 75 disposed on opposite sides of a crop row and which in conventional manner, operates to gather stalks and ears into the crop harvester. The harvesting mechanism itself is composed of a pair of gathering chains 76, 77 on opposite sides of the row which operate to move the stalks rearwardly as the harvester advances. Also provided is a pair of snapping bars 78 and a pair of conventional rotating rolls 79 which operate to draw the stalks downwardly until the ears contact the bars 78 and are detached from the stalk. Harvesting mechanism of this type is, of course, conventional and the only purpose of description is generally for orientation purposes, there is no intention to include in the present invention anything but a general recitation of a harvesting mechanism.

Figure 4:
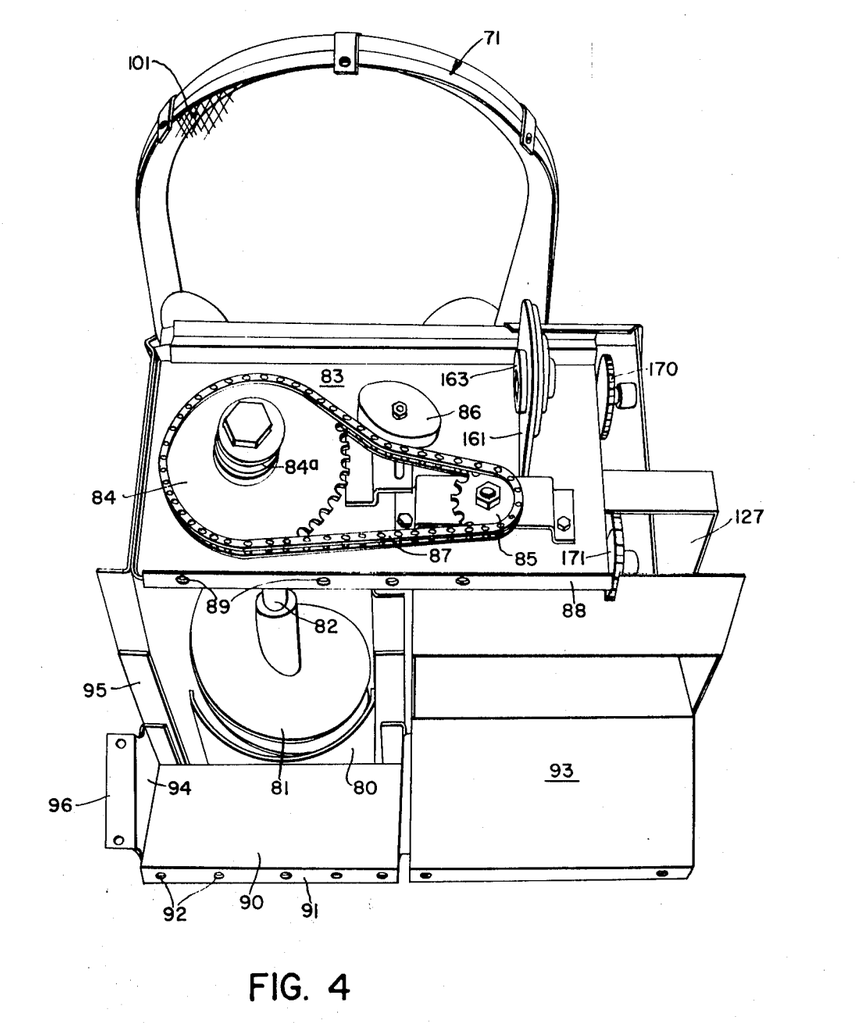
FIG. 4 is a rear perspective view of one of the harvester units.

The ears of corn are detached from the stalk and fall laterally into a side trough 80 which has an auger 81 therein for delivering the ears rearwardly. The auger 81 is provided with a drive shaft 82 which extends rearwardly through a rear transverse bulkhead 83 where a suitable journal, not shown, is provided for support thereof. Supported on the auger shaft 82 and rearwardly of the bulkhead 83 is a sprocket 84 and conventional slip clutch 82. A drive sprocket 85 is also supported on the bulkhead 83 as is a take-up cam 86. A chain 87 extends over both of the sprockets 84, 85. Viewing FIG. 4 specifically, it will be noted that the rear bulkhead 83 is provided at its lower edge with a rearwardly and laterally extending flange 88 with a series of transversely spaced openings 89 therein. When mounted on the transverse conveyor section 21, the flange 88 rests upon the rear mounting rail 48 and the openings 89 will register with suitable openings 50 in the rail 48. The floor of the auger trough 80 is terminated short of the bulkhead 83 to provide a downward discharge opening which, as will later become apparent, permits the harvested crop to gravitate into the transverse conveyor section 21. Just beneath the rear terminal edge of the floor 80 is a downwardly inclined panel 90 having a forwardly extending laterally disposed flange 91 with transversely spaced openings 92 therein. The flange 91 normally rests against the upper surface of the front mounting rail or beam 47 and the openings 92 will lie in registry with the openings 49 in that rail. It will be noted that the forward rail 47 is considerably lower than the rear rail 48, the vertical offset being provided so that the row units may have a relatively low angle of inclination. To the side of the discharge opening of the side auger 81 are further panel means, indicated in its entirety by the reference numeral 93, which closes the conveyor section 21 from the top. On the left edge of the opening formed by the trough 80 and the bulkhead 83 there is provided a triangularly shaped panel 94 which closes the joint between the row unit and the transverse conveyor section 21 at that side. Suitable flanges, as at 95, 96 are provided on the row unit so as to provide means for connecting paneling for closing the conveyor section 21 between the adjacent row units 70, 71.

It will be noted that the auger flight 81 terminates substantially at the terminal edge of the trough 80 and that the shaft 82 extends beyond the end of the flight 81 to the bulkhead 83. Mounted on the shaft 82 just forwardly of the bulkhead 83 is a flexible paddle 100 extending radially from the shaft 82 which operates upon rotation of the shaft to beat or to drive some trash and the harvested crop downwardly into the transverse conveyor section 21. The row unit 71 has a suitable styling or metallic housing covering much of the operating mechanism of the harvester and includes an arcuate shaped expanded metal grillwork which extends around the upper rear end of the row unit. It should here be noted that the transverse conveyor section is generally U-shaped with the front and rear walls 40, 42 extending upwardly to upper free edges as indicated by the flanges 45, 46. The row unit 71 when bolted to the front and rear flanges of the walls 40, 42 generally rigidify the cross conveyor section 21 by placing a rigid connection between the two walls 40, 42.

Figure 3:
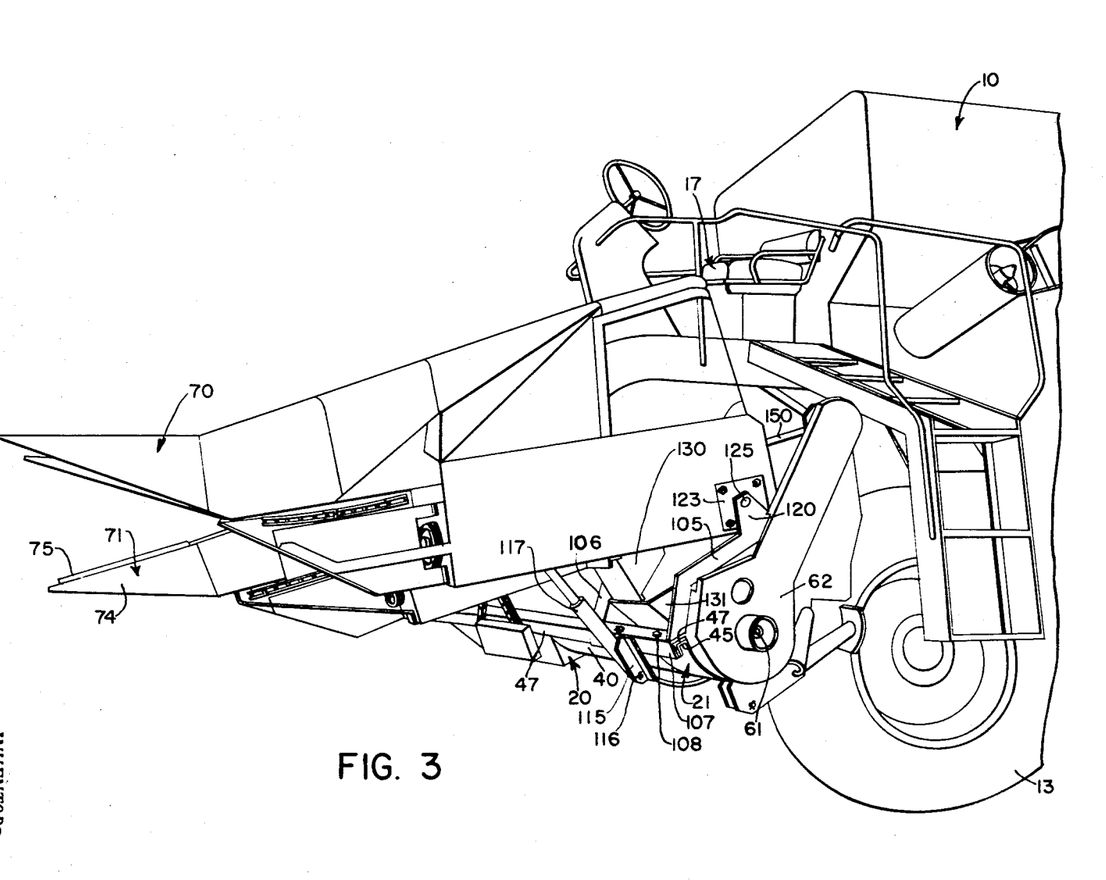
FIG. 3 is an enlarged side perspective view of the forward portion of the combine and the harvester units taken from the opposite side of the assembly.

As previously mentioned, the manner of mounting the outer row units 70, 73 on the transverse conveyor sections 21, 22 is somewhat different than the manner of mounting the inner row units 71, 72 on the transverse conveyor sections 21, 22. Referring specifically now to FIGS. 3 and 7 and specifically to the manner of mounting the outer row unit 70 on the transverse conveyor section 21, there is provided a pair of fore-and-aft bracket structures 105, 106. The brackets 105, 106 are rigidly interconnected at their forward ends by a laterally disposed and transverse angle iron 107 which ride or rests on the guide rail 47. The angle iron 107 is fixed to the rail 47 by means of bolts 108. The rear ends of the brackets 105, 106 are welded to transversely spaced gusset plates disposed to ride against and to be fixed to the vertical flange of a rear transverse angle iron 113 by means of bolts 111, 112. The horizontal flange of the angle iron 113 is provided with a series of transversely spaced holes, not shown, which will receive bolts 114 for purposes of connecting the angle iron 113 to and for permitting transverse repositioning of the unit 70 relative to the transverse conveyor sections 21, 21a. The angle iron 107 has a vertically disposed flange on which is welded a vertically disposed bracket structure, indicated in its entirety by its reference numeral 115, which carries on a transverse pivot pin 116 an hydraulic cylinder 117. Fixed to the side frames or brackets 105, 106 are upwardly extending plates 120, 121 respectively. The left upright side wall or panel 122 has a pad 123 bolted thereto and the pad 123 has an outwardly extending trunnion 124 which receives a transverse pin 125 fixed to the upright plate 120. On the opposite side of the row unit 70 and axially coextensive with the pivot pin 125 is a pivot pin 126 which is carried on the plate structure 121. The row unit 70 is provided with a structural beam, shown at 127, in FIG. 4, having a depending trunnion bracket 128 which fits over the pin 126. As may be clearly evident, therefore, the entire row unit 70 may swing vertically about the axis of the pivot pins 125, 126. The degree of vertical movements is, of course, controlled by the amount of extension or retraction of the hydraulic cylinder 117.

To accommodate vertical movement of the row unit 70 about its pivots, the underside of the row unit is provided with a hopper structure, indicated in its entirety by the reference numeral 130. The frame for the row unit 70 which includes the side numbers 105, 106 and the angle iron interconnecting angle iron 107, has fixed thereto a hopper 131 which complements the hopper 130 in the respect that they telescope relative to one another upon raising or lowering of the outer row unit 70. It should also be noted that the side frames or brackets 105, 106 rigidly interconnect the upper edges of the transverse conveyor housing sections 21, 21a to thereby rigidify the entire housing.

Before leaving the general subject of the harvester itself, it should be recognized that the transverse conveyor sections 21, 22 are generally not of the same length relative to the fore and aft center line of the harvester. The extension 21a is only on the left end of the transverse conveyor system due to the nature of the row units. It will be noted that the side conveyors 80, 81 of the row units are on the left side. Therefore, the row unit 73 on the complete right end of the conveyor 22 is capable of extending considerably beyond the end of the conveyor section 22. However, on the left end, and when it is desirable to harvest corn in rows at relatively wide spacing, it is necessary to add the extension 21a so as to extend the transverse conveyor section 21 to a length sufficient to collect material from the side conveyor of the outer row unit 70.

The power for operating the entire harvester mechanism is received directly from the main power source of the combine. Power is transmitted through a pinion sprocket 140 on the side of the combine through a chain 141 which extends over a drive sprocket 142 carried on a trunnion shaft 143 on the rear end of the central conveyor section 20. A short trunnion shaft, not shown, is also provided on the opposite side of the housing and the two trunnion shafts operate as the pivotal connecting means for connecting the harvester to the forward end of the combine. The exact manner of connection is not presently shown, but is generally identical to the trunnion type connection shown and described in U.S. Pat. 2,794,307 which issued to Messrs. C. S. Morrison, H. H. Denison, and F. D. Jones. Generally for the purpose of the present description it should be recognized that the entire forward harvester mechanism may be raised and lowered about the axis of the trunnion shafts 143, 144 by means of extending or retracting the hydraulic cylinders 35, 36 previously described.

Rigid with the driven sprocket 142 is a second sprocket 145. A chain 146 extends over the sprocket 145 forwardly to a sprocket 147 which is carried on a main transverse drive shaft means, indicated in its entirety by reference numeral 148. The transverse drive shaft means is composed of a series of three transversely aligned shaft sections including a central shaft section 149 and a pair of outer shaft sections 150, 151. The outer shafts 150, 151 are connected to rotate in unison with the central shaft 149 by means of a pair of telescoping shaft sections 152, 153 which are hollow and slidably receive the adjoining ends of the respective shaft sections 149, 150, 151. Consequently all sections 149–153 will rotate in unison and are driven by the chain 146 and the sprockets 172 are slidably and axially adjustable with respect to the central drive shaft 149 through their telescoping shafts 150, 151, 152, 153. The entire shaft means 148 is easily adapted for extension or retraction.

Bolted to the rear bulkheads 83 on row unit 71 and on row unit 72 are a pair of rearwardly extending brackets 161, 162 respectively. The brackets 161, 162 provide axially and transversely spaced apart self-aligning bearings 163, 164 respectively which receive the central transverse shaft section 149. Consequently it is evident that the central shaft section 149 is supported from the centrally positioned row units 71, 72. Supporting the left outer shaft section 150 is a pair of upwardly extending bracket structures 165, 166 welded or otherwise fixed to the transverse auger housing sections 21a, 21 respectively. The brackets 165, 166 carry at their upper ends self-aligning bearings, one of which is shown at 167, which carry the shaft section 150. The bracket structure 169 is fixed to the rear wall of the auger housing section 22 and extends upwardly therefrom. The upper end is provided with a bearing 168 which carries the right outer shaft section 151.

The drives from the transverse shaft means 148 to the respective row units 70, 73 are identical. There is provided on each of the row units an upper idler sprocket 170 and a lower driven sprocket 171. Directly to the rear of the sprockets 170, 171 and mounted on the central shaft means 149 is a rotary drive member or sprocket 172 with a suitable slip clutch which permits the individual units 70, 71, 72, or 73 to cease operation in case of malfunction or clogging. A chain 173 supplies the drive connection betwen the drive sprocket 172 and the idler and driven sprockets 170, 171 respectively. The sprocket 171 is supported on a shaft which is part of a gear transmission, shown only partially at 174 which also has a rearwardly extending shaft 175 which extends through the bulkhead 83 and carries thereon the sprocket 85 which operates the conveyor 81. Extending forwardly from the gear housing 174 are suitable drive means and generally conventional drive means which operate the harvesting rolls 79 and the gathering chains 76, 77.

Referring to FIG. 8, it should be noted that the driven sprocket 171 on the outer row unit 70 rotates about an axis coextensive with the axis of the pivot pins 125, 126. Consequently irrespective of the vertical position of the outer row unit 70, the chain 173 will remain in a driving position relative to the sprocket 171. As is rather obvious, the right outer row unit 73 is provided with a similar mounting arrangement as well as a basic drive arrangement as the left outer row unit 70.

Also provided on the outer shaft sections 150, 151 are chain drives 180, 181 which extend downwardly and drive the transverse augers contained in the auger housing sections 21, 22. Referring to FIG. 9, the chain drive 180 drives the sprocket 60 which in turn rotates the auger 54. A similar arrangement is provided for the auger in the right housing section 22.

Figure 5:
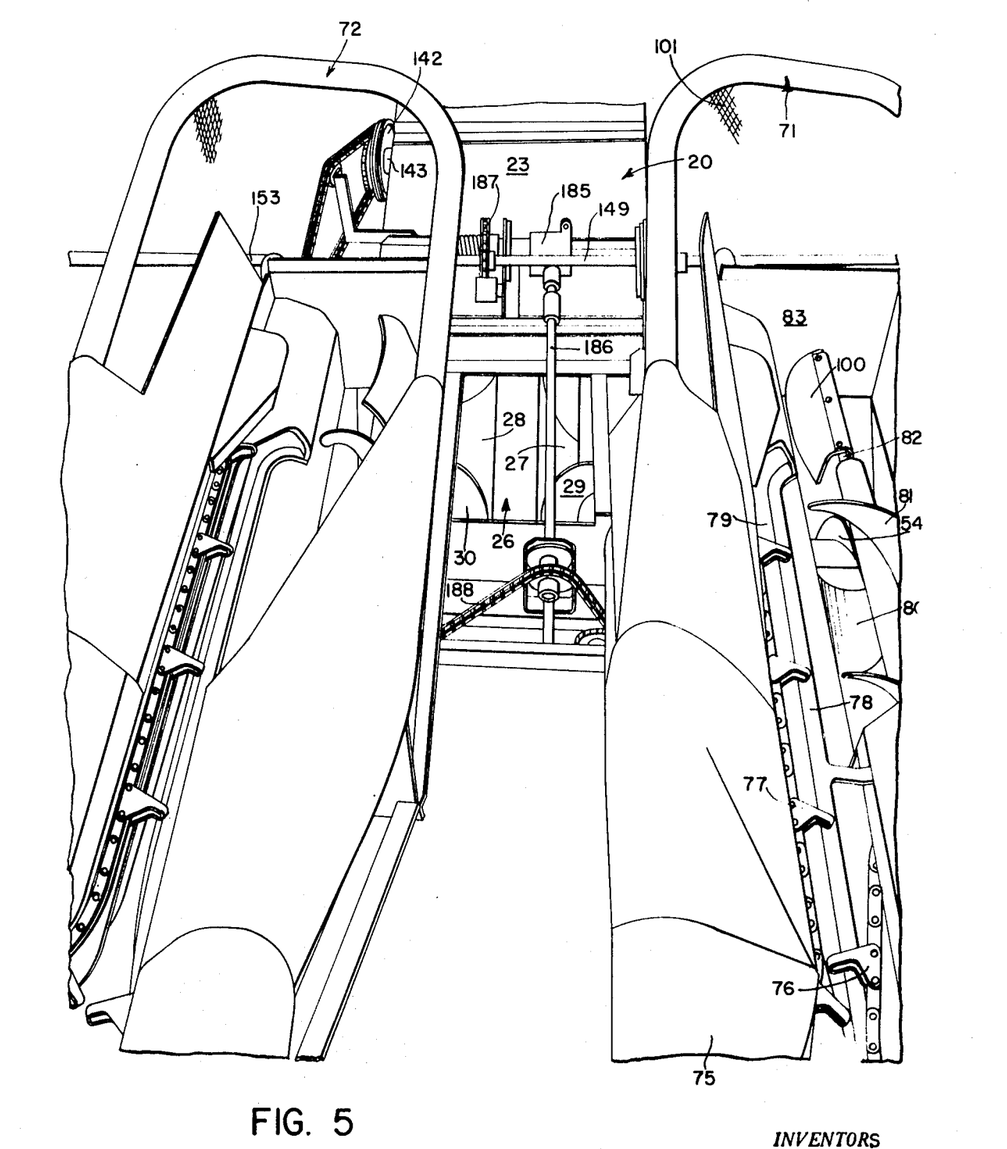
FIG. 5 is an enlarged front perspective view looking at a portion of the central pair of row units and the forward end of the conveying mechanism, portion of the housing structure being removed to show the conveyor mechanism.

Fixed to the top laterally disposed panel 23 of the central conveyor section 20 is a gear transmission 185 (FIG. 5) having a forwardly directed rotating shaft 186. Power for operating the shaft 186 is provided from the central transverse shaft section 149 through means of a chain drive 187 which extends rearwardly from the shaft 149 to the gear transmission 185. The shaft 186 terminates forwardly of the forward ends of the auger 29, 30. A chain drive 188 extends from the forward end of the shaft 186 downwardly to the shafts of the respective augers 29, 30. As may be clearly seen therefore the entire harvester mechanism is driven from the transverse shaft means 148, which in turn is driven directly from the power source of the combine and directly from the sprocket 140 on the combine.

In operation, all four row units 70–73 will harvest in unison. The outer row units 70 and 73 may be raised and lowered relative to the central row units 71 and 72 by operating the respective hydraulic units, such as at 117 which controls the position of the units 70, 73. The entire harvester mechanism may be raised and lowered for adjusting for working position or for moving the harvesting mechanism into transport position merely by adjusting the hydraulic cylinders 35, 36. As is quite evident, the entire harvester mechanism may be easily mounted and dismounted from the combine merely by removing the trunnions which support the trunnion shafts 144, 143 and removing the chain 141.

While only one form of the invention has been shown it should be recognized that other forms and variations will occur to those skilled in the art. Therefore, while the preferred form of the invention has been clearly and concisely illustrated for purposes of fully explaining the principles of the invention, it is not the intention to limit or narrow the invention beyond the broad concept set forth in the appended claims.

What is claimed is:

1. A corn harvester on a mobile corn treating unit having transversely spaced traction wheels and a forwardly located crop inlet, comprising: a T-shaped auger housing structure including a forwardly directed stem section having a pair of fore-and-aft extending auger troughs discharging into the crop inlet and a transverse bar section extending to opposite sides of the forward end of the stem section and forwardly of the traction wheels, said bar section having an auger trough opening upwardly with upright and transverse front and rear walls extending to upper front and rear edges respectively, a plurality of forwardly directed and transversely spaced crop harvesting units supported for transverse adjustment along the bar section, each unit being inclined from a forward end adjacent the ground to an upper rear discharge end adjacent the bar section of the auger housing structure, each of the harvesting units further having forward crop gathering and harvesting mechanism effective to harvest ears of corn from a row of corn and advance the ears to its discharge end as the corn treating unit advances; and housing means for the harvester including a portion connecting the front and rear edges of said walls to effect rigidity between the walls.

2. A crop harvester on a mobile crop treating unit having transversely spaced traction wheels and a forwardly located crop inlet, comprising: a T-shaped conveyor housing structure including a forwardly directed stem section discharging into the crop inlet and a transverse bar section extending to opposite sides of the forward end of the stem section and forwardly of the traction wheels, said bar section having a conveyor trough opening upwardly; a plurality of forwardly directed and transversely spaced crop harvesting units, each unit having a housing structure inclined from a forward end adjacent the ground to an upper rear end above the bar section of the conveyor housing structure and forward fore-and-aft extending crop gathering and harvesting mechanism effective to harvest material from a crop row as the crop treating unit advances, said row unit further having a fore-and-aft extending side conveyor transversely offset to the side of the gathering and harvesting mechanism for moving the harvested crop rearwardly, said side conveyor including a fore-and-aft extending auger trough having a floor opening at its rear end above and opening downwardly into the upwardly opening conveyor trough, and an auger conveyor means seated in the trough for moving material to the opening for gravitation into the bar section of the T-shaped conveyor housing structure; and selective means connecting the row unit housing structures to the bar section of the conveyor housing structure and for adjusting the units transversely along the bar section to vary spacing between the row units to accommodate various spacing between crop rows.

3. A crop harvester on a mobile crop treating unit having transversely spaced traction wheels and a forwardly positioned crop inlet, comprising: a conveyor housing structure discharging into the crop inlet including a transverse trough section disposed forwardly of the treating unit, a plurality of forwardly directed and transversely spaced crop harvesting units supported for transverse adjustment along the transverse trough section to accommodate various spacing between the crop rows, each unit being inclined from a forward end adjacent the ground to an upper discharge end adjacent the trough section; and the transverse trough section being convertible in its transverse width to accommodate variations of the overall transverse expanse of the crop harvesting units.

4. The structure as set forth in claim 3 in which the trough section is convertible by means of adding and removing a trough extension to complement the increase or decrease in overall width of the row units.

5. A crop harvester on a mobile crop treating unit having a crop inlet and a main drive means, comprising: a T-shaped structure including a forwardly directed conveyor section discharging rearwardly into the crop inlet and a transverse conveyor section extending to opposite sides of the forward end of the forwardly directed section; a plurality of forwardly directed and transversely spaced crop harvesting units, each unit being inclined from a forward end adjacent the ground to an upper and rear end adjacent to and discharging into the transverse conveyor section and having forward crop gathering and harvesting mechanism effective to harvest crops from a crop row as it advances and including means for advancing the crop to the rear end; transverse selective means connecting the row units to the conveyor structure adjacent the transverse conveyor section and for adjusting the spacing between the units to accommodate various spacing between the crop rows; and drive means for the harvesting units including a transverse drive shaft means supported on the T-shaped structure adjacent the transverse conveyor section and extending across the transverse expanse of a plurality of said row units and a drive extending from the drive shaft means to each of the latter row units for operating the respective harvesting mechanisms, each drive being axially shiftable with respect to the drive shaft means to thereby be adaptable to accommodate various positioning of the harvesting units to the spacing between the crop rows.

6. A crop harvester on a mobile crop treating unit having a crop inlet and a main drive means, comprising: a conveyor structure discharging rearwardly into the crop inlet and including a transverse conveyor section extending to opposite sides of and disposed forwardly of the crop treating unit; a plurality of forwardly directed and transversely spaced crop harvesting units, each unit having a forward end adjacent the ground and an upper and rear end adjacent the transverse conveyor section and forward crop gathering and harvesting mechanism effective to harvest crops from a crop row as it advances; transverse selective means connecting the harvesting units to the conveyor structure adjacent the transverse conveyor section and for adjusting the spacing between the harvesting units to accommodate various spacing between the crop rows; a transverse drive shaft supported by the transverse conveyor section; means connecting the drive shaft to the main drive means for effecting rotation of the drive shaft; drive means extending from the drive shaft to each of the harvesting units for operating the respective harvesting mechanisms, said latter drive means being adjustable axially with respect to the transverse drive shaft to accommodate various transverse positions of the harvesting units.

7. The invention defined in claim 6 in which the drive means extending from the drive shaft to each of the harvesting units includes a slip clutch therein whereby the respective harvesting mechanism may be disengaged from operation without effecting the operation of the harvesting mechanisms of the other harvesting units.

8. A crop harvester on a mobile crop treating unit having transversely spaced traction wheels and a forwardly located crop inlet, comprising: a T-shaped structure including a forwardly directed conveyor stem section discharging into the crop inlet and a transverse bar section having transverse conveyor means extending to opposite sides of the forward end of the stem section and forwardly of the traction wheels, said conveyor means having an upwardly opening conveyor trough; a plurality of forwardly directed and transversely spaced crop harvesting row units, each unit being inclined from a forward end adjacent the ground to an upper rear end having a downwardly opening discharge outlet above the bar section of the conveyor housing structure and having forward crop gathering and harvesting mechanism effective to harvest crops from a crop row as the treating unit advances, with each of said row units further having a conveyor for moving the harvested crop rearwardly to the outlet and a beater mechanism above the outlet for driving the harvested crop downwardly through the outlet and into the trough, and selective means connecting the row units to the bar section of the structure and for adjusting the transverse positions of the units along the bar section in order to vary the spacing between the row units to accommodate various spacing between rows of crops.

9. A crop harvester on a mobile crop treating unit having transversely spaced traction wheels and a forwardly located crop inlet, comprising: a conveyor housing structure mounted on the treating unit including a central section discharging into the crop inlet and transverse sections extending to opposite sides of the central section and forwardly of the traction wheels, a plurality of forwardly directed and transversely spaced crop harvesting row units inclined from forward ends adjacent the ground to upper rear ends above the transverse sections, and having forward crop gathering and harvesting mechanisms effective to harvest from crop rows as the treating unit advances, said row units further having downwardly opening discharge outlets at their rear ends above the transverse sections and fore-and-aft extending conveyors for moving the harvested crop rearwardly to the rear ends for gravitational discharge through the outlets and into the transverse sections, and selective means connecting the transverse sections to the row units and being adjustable to vary the transverse positions of the units along the transverse sections to permit different transverse spacings between the row units.

10. A crop harvester on a mobile crop treating unit having transversely spaced traction wheels and a forwardly located crop inlet, comprising: a conveyor housing structure mounted on the treating unit including a central section discharging into the crop inlet and transverse sections extending to opposite sides of the central section and forwardly of the traction wheels, a plurality of forwardly directed and transversely spaced crop harvesting units, said units being inclined from forward ends adjacent the ground to upper rear ends discharging into the transverse sections and having forward crop gathering and harvesting mechanisms effective to harvest the crop from crop rows as the treating unit advances, trough means transversely offset to a side of and from receiving the harvested crop from the harvesting mechanisms, auger means seated in the trough means for advancing the crop to the rear ends, said trough means having outlets opening downwardly at the rear ends to permit the harvested crop to gravitate into the respective transverse sections, and means connecting the structure to the row units for transverse adjustment of the latter along the transverse sections; and rotatably driven paddle wheel means rotatable with said auger means and positioned above the outlets in the trough means for driving the harvested crop downwardly through said outlet and into the transverse sections.

11. A crop harvester on a mobile crop treating unit having a crop inlet and a main drive means, comprising: a T-shaped structure including a forwardly directed conveyor section discharging rearwardly into the crop inlet and transverse conveyor sections extending to opposite sides of the forward end of the forwardly directed section; a plurality of forwardly directed and transversely spaced crop harvesting units, said units being inclined from forward ends adjacent the ground to upper and rear discharge ends adjacent to and for discharging into the transverse conveyor sections, and having forward crop gathering and harvesting mechanisms effective to harvest crops from crop rows as the harvester advances; selective means connecting the harvesting units to the T-shaped structure and for adjusting the transverse spacing between the row units along the transverse sections to accommodate various spacing between the crop rows; and drive mechanism including a transverse drive shaft means supported adjacent the rear ends of the row units and connected to the main drive means for effecting rotation thereof and a harvesting unit drive extending from the transverse drive shaft means to each of the units, each of said harvesting unit drives being movable axially with respect to the transverse drive shaft means to accommodate various transverse spacings between the harvesting units.

12. A crop harvester on a mobile crop treating unit having a crop inlet and a main drive means, comprising: a conveyor discharging rearwardly into the crop inlet and including a transverse conveyor means extending to opposite sides of and disposed forwardly of the crop treating unit; a plurality of forwardly directed and transversely spaced crop harvesting units, said units extending from forward ends to rear discharge ends adjacent to and discharging into the transverse conveyor means and having crop gathering and harvesting mechanism effective to harvest crops from crop rows as it advances, and means for advancing the crops to the rear ends; means connecting the crop harvesting units for transverse adjustment along the transverse conveyor means to accommodate various spacing between the crop rows; and drive mechanism including a transverse drive shaft extending transversely across the expanse of a plurality of harvesting units and supported adjacent the transverse conveyor means, said drive shaft being connected to the main drive means for effecting rotation thereof, and a unit drive extending from the drive shaft to each of the respective harvesting units, said drive mechanism being adjustable transversely to accommodate various transverse spacings between the units.

13. The structure as set forth in claim 12 in which the drive extending from the transverse drive shaft to the respective units includes a rotatable drive element on the shaft rearwardly of each of the units and drivingly connected to mechanism of the respective units, and the transverse drive shaft is composed of telescoping and axially aligned sections convertible to alter the effective length in accordance with the transverse positioning requirements of the harvesting units.

14. The structure as set forth in claim 12 in which the transverse conveyor means includes an auger trough having front and rear sides and further characterized by a transverse beam forwardly of and extending across the forward side of the auger trough, and the means connecting the crop harvesting units for transverse adjustment along the transverse conveyor means are detachable connections between the harvesting units and the beam.

15. The structure as set forth in claim 12 further characterized by beater structure at the rear ends of the harvesting units for aiding movement of material into the transverse conveyor means.

16. The structure as set forth in claim 15 in which the beater structure is composed of a rotating shaft section with radial paddles thereon.

17. The structure as set forth in claim 12 in which the transverse conveyor means includes a transverse auger trough with a forward side having an upper edge over which material may move into the trough and which is lower than and rearwardly of the upper discharge ends of the harvesting units and further characterized by junctures between the respective rear ends of the harvesting units and the forward upper edge of the trough, each of the junctures including a downwardly and rearwardly inclined panel extending from the discharge ends of the harvesting units to a lower edge joining the upper edge of the auger trough.

18. The structure as set forth in claim 12 further characterized by the row units having rotatable harvesting rolls and a conveying mechanism for moving crops to the rear end of the respective unit, and in which the drive between the transverse drive shaft means and its respective unit includes a rotatable drive element on the shaft rearwardly of the unit, a drive sprocket on the unit for operating the conveying mechanism, a gear drive on the unit for rotating the harvesting rolls, and with the drive sprocket and gear transmission being drivingly connected to the rotary element on the shaft.

19. A harvesting attachment adapted to be removably mounted on a combine for simultaneously harvesting a plurality of spaced crop rows; said attachment comprising main frame means, a harvesting unit for each crop row, mounting means mounting said units in laterally spaced relation on said main frame means in accordance with the spacing of the crop rows, said mounting means for at least one of said units laterally adjustably mounting the latter relative to an adjacent unit to vary the lateral spacing therebetween, power operated means independent of said mounting means mounted on and laterally adjustable with respective ones of said adjacent units to drive the latter in any adjusted position thereof, means for conducting power to one of said power operated means, and coupling means adjustably drivingly coupling said one of said power operated means to the other thereof to transmit power therebetween while accommodating variation in the lateral spacing between said adjacent units.

20. The harvesting attachment according to claim 19, wherein said mounting means comprises bracket means carried by each of said units and engageable with said main frame means to mount said units thereon, and key means cooperable between said main frame means and each of said bracket means to space said units laterally relative to each other, said key means associated with said one of said units permitting adjustment of said bracket means of the latter laterally thereon to different positions.

21. The harvesting attachment according to claim 19 wherein said power operated means comprises a rotatable drive shaft mounted on respective ones of said adjacent units to drive the latter, and wherein said coupling means comprises a coupling shaft extending between said drive shafts, and means adjustably coupling said coupling shaft to said drive shafts to accommodate variation in the lateral spacing between said adjacent units.

22. A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units laterally adjustably mounting the latter relative to an adjacent unit to vary the lateral spacing therebetween, power operated means independent of said mounting means mounted on and laterally adjustable with respective ones of said adjacent units to drive the latter in any adjusted position thereof, means for conducting power to one of said power operated means, and coupling means adjustably drivingly coupling said one of said power operated means to the other thereof to transmit power therebetween while accommodating variation in the lateral spacing between said adjacent units.

23. The combine corn header attachment according to claim 22 wherein there are four of said snapping units, at least the two outside units being laterally adjustable on said support beam relative to the respective adjacent units.

24. The combine corn header attachment according to claim 22 wherein said mounting means comprises bracket means carried by each of said units and engageable with said beam to mount said units thereon, and key means cooperable between said beam and each of said bracket means to space said units laterally relative to each other, said key means associated with said one of said units permitting adjustment of said bracket means of the latter laterally thereon to different positions.

25. The combine corn header attachment according to claim 22 wherein said mounting means comprises bracket means carried by each of said units and engageable with said beam to mount said units thereon, and key bar means fixedly secured to said beam and cooperable with said bracket means to space said respective units laterally relative to each other, said key bar means associated with said one of said units including a plurality of laterally spaced seats cooperable with said bracket means of said one of said units for adjustment of the latter to different positions laterally on said beam.

26. The combine corn header attachment according to claim 22 wherein said power operated means comprises a rotatable drive shaft mounted on respective ones of said adjacent units to drive the latter, and wherein said coupling means comprises a coupling shaft extending between said drive shafts, and means adjustably coupling said coupling shaft to said drive shafts to accommodate variation in the lateral spacing between said adjacent units.

27. The combine corn header attachment according to claim 22 wherein said power operated means comprises a rotatable drive shaft mounted coaxially on respective ones of said adjacent units to drive the latter, and wherein said coupling means comprises a coupling shaft extending coaxially between said drive shafts, and means demountably coupling opposite ends of said coupling shaft to said drive shafts and permitting mounting of a second coupling shaft of a different length therebetween to accommodate variation in the lateral spacing between said adjacent units.

28. The combine corn header attachment according to claim 22 wherein each of said units comprises a unit frame extending longitudinally forwardly from said beam, a pair of rotatable snapping rolls mounted longitudinally along each unit frame in side-by-side snapping relation, and wherein said power operated means comprises a pair of roll drive shafts respectively rotatably mounted on said adjacent unit frames and drivingly connected to said respective pairs of rolls carried thereby, and wherein said coupling means comprises a coupling shaft extending between said roll drive shafts, and means adjustably coupling said coupling shaft to said roll drive shafts to accommodate variation in the lateral spacing between said adjacent unit frames.

29. A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with spacing of the rows of corn, said mounting means for at least one of said units laterally adjustably mounting the latter relative to an adjacent unit to vary the lateral spacing therebetween, power operated means for driving said units and including adjustable drive means interconnecting said adjacent units to accommodate variation in the lateral spacing therebetween, said mounting means comprising bracket means carried by each of said units and engageable with said beam to mount said unit thereon, and key means cooperable between said beam and each of said bracket means to space said units laterally relative to each other, said key means associated with said one of said units permitting adjustment of said bracket means of the latter laterally thereon to different positions.

30. A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with spacing of the rows of corn, said mounting means for at least one of said units laterally adjustably mounting the latter relative to an adjacent unit to vary the lateral spacing therebetween, power operated means for driving said units and including adjustable drive means interconnecting said adjacent units to accommodate variation in the lateral spacing therebetween, said mounting means comprising bracket means carried by each of said units and engageable with said beam to mount said units thereon, and key bar means fixedly secured to said beam and cooperable with said bracket means to space said respective units laterally relative to each other, said key bar means associated with said one of said units including a plurality of laterally spaced seats cooperable with said bracket means of said one of said units for adjustment of the latter to different positions laterally on said beam.

31. A combine corn header attachment for simultaneously harvesting a plurality of spaced rows of corn; said attachment comprising main frame means including a laterally extending support beam removably mountable on a combine, a plurality of snapping units, mounting means mounting said units in laterally spaced relation on said support beam in accordance with the spacing of the rows of corn, said mounting means for at least one of said units laterally adjustably mounting the latter along said support beam and relative to an adjacent unit to vary the lateral spacing therebetween, and means independent of said mounting means for driving said units, said means being adjustable to provide a power drive from the combine to both the snapping means and gathering means of each unit in any laterally adjusted position on said support beam.

32. The combine corn header attachment according to claim 31 wherein said snapping units include rotatable snapping means and driven gathering means, said means for driving said units including driving means parallel to said support beam to provide power drive from the combine to both the snapping means and the gathering means of each unit in any laterally adjusted position of the unit on said support beam.

33. A corn harvesting implement adapted to harvest simultaneously several spaced rows of corn comprising: a main frame including a transverse beam; drive shaft means rotatably mounted on said frame parallel to said beam; a plurality of crop gathering units, each having gathering chains and harvesting rolls; means mounting each of said units on said beam so that the weight of the units is supported by the beam, with at least one of the units being selectively movable to permit shifting thereof lengthwise of the beam in order to change the distance between the unit and the adjacent unit; transmissions for the chains and harvesting rolls mounted on the units and connected to the drive shaft means to thereby transmit the motive power to the gathering chains and harvesting rolls upon rotation of the drive shaft means, the transmission for at least the aforesaid unit that is movable along the beam being able to slide axially with respect to the drive shaft means to permit the respective unit to be moved lengthwise of the beam without interrupting the engagement of the transmission with the drive shaft means.

34. A corn harvesting implement as defined in claim 33 in which the transmission unit that is axially slidable includes at least one rotatable driving member mounted to shift axially with respect to the shaft means but without being able to turn on the shaft, and at least one rotatable drive member on the respective unit that is driven by the driving member.

35. A corn harvesting implement adapted to harvest simultaneously several spaced rows of corn comprising: a main frame including a transverse beam structure; a plurality of crop gathering units, each having gathering chains and harvesting rolls; means mounting each of said units on said beam structure so that the weight of the units is supported by the beam structure and to permit shifting thereof lengthwise of the beam structure in order to change the distance between the units; transmissions for the chains and harvesting rolls mounted on the units and spaced transversely apart; a singular drive shaft structure extending transversely substantially the full width of the implement and connected to the transmissions to thereby transmit the motive power to the gathering chains and harvesting rolls upon rotation of the drive shaft structure, the transmission of at least the aforesaid unit that is movable along the beam structure being able to shift axially with respect to the axis of the drive shaft structure to permit the respective unit to be shifted lengthwise of the beam structure without interrupting the engagement of the transmission with the drive shaft structure.

36. A corn harvesting implement adapted to harvest simultaneously several spaced rows of corn comprising: a main support; a transverse beam means carried by the support; a plurality of crop gathering units, each having gathering chains and harvesting rolls; means mounting each of said units on said beam means so that the weight of the units is supported by the beam means and to permit shifting thereof lengthwise of the beam means in order to change the distance between the units; transmissions for the chains and harvesting rolls mounted on the units spaced transversely apart; a singular drive shaft structure supported on the frame extending transversely the transverse expanse of the transmissions and connected to the transmissions to thereby transmit the motive power to the gathering chains and harvesting rolls upon rotation of the drive shaft structure, the transmissions units being able to shift axially with respect to the axis of the drive shaft structure to permit the respective units to be moved lengthwise of the beam means without interrupting the engagement of the transmissions units with the drive shaft structure.

37. The corn harvesting implement as defined in claim 36 in which the transmissions include a plurality of drive members, one for each of said row units, spaced transversely along the drive shaft structure on the order of the transverse spacing of the units and supported on the shaft structure for rotation therewith and in which the drive members are axially shiftable with respect to the axis of the shaft structure by axially sliding junctures along the shaft structure.

38. A corn harvester adapted for support on a combine having a main power source comprising: a housing structure adapted for support at its rear end on the forward end of the combine and projecting therefrom to a forward end; a transverse harvester framework extending forward of and adapted for connection to the forward end of the housing structure, the harvester framework including a transverse horizontal beam extending across a plurality of corn rows; a transverse drive shaft adjacent the beam and also extending across a plurality of corn rows; a plurality of harvesting structures adapted for simultaneous harvesting of a plurality of corn rows, each harvesting structure being fixedly attachable at various transverse positions on the beam and having drive mechanism at its rear end for driving harvesting mechanism thereon, the drive mechanisms having rotary drive members concentric with and mounted on the shaft for effecting rotation therewith, at least part of said rotary drive members being shiftable axially with respect to the shaft axis to accommodate various transverse positions of the units on the beam; and a slip clutch between the rotary drive member of each structure and the shaft permitting the harvesting mechanism of the respective harvesting structure to cease operation.

39. A corn harvesting header for simultaneously harvesting a plurality of spaced rows of corn comprising: main frame means, a laterally extending support carried by said main frame means, drive shaft means rotatably supported on said main frame means in parallel relationship with said support, a plurality of gathering and snapping units each having gathering chains and snapping rolls, mounting means for each of said gathering and snapping units securing the gathering and snapping units to said support such that the weight of said gathering and snapping units is supported on said support, the mounting means for at least one of said gathering and snapping units being selectively releasable to permit said one gathering and snapping unit to be moved along the support to vary the spacing between said one gathering and snapping unit and an adjacent gathering and snapping unit, gathering chain and snapping roll transmission means on each of said gathering and snapping units drivingly engaged with said drive shaft means for transmitting drive to the gathering chains and snapping rolls upon rotation of said drive shaft means, the transmission means for at least said one gathering and snapping unit being slidable relative to said drive shaft means to permit said one gathering and snapping unit to be moved along said support without interrupting the engagement of its transmission means with said drive shaft means.

40. A corn harvesting header as defined in claim 39 wherein each of said gathering chain and snapping roll transmission means includes at least one driving member slidably and non-rotatably engaged with said drive shaft means, and at least one driven member drivingly connected with said driving member.

41. A corn harvesting header as claimed in claim 39 wherein said drive shaft means compresses a non-circular drive shaft and wherein said transmission means includes driving members, each of said driving members having non-circular axial connections of similar configuration to said shaft, and with at least one of said driving members being axially slidably connected with the drive shaft, and driven members rotatably mounted on said gathering and snapping units, said driven members being drivingly connected with the respective driving members on the drive shaft.

42. A corn harvesting header as claimed in claim 39 wherein said snapping rolls are drivingly connected with the transmission means of each of said gathering and snapping units for simultaneously driving the snapping rolls of all of said gathering and snapping units and said gathering chains are drivingly connected with the transmission means of each of said gathering and snapping units for simultaneously driving the gathering chains of all of said gathering and snapping units, and said drive shaft means on said main frame means comprises a power shaft journaled on said main frame means extending across a plurality of units and drivingly connected with the respective transmission means.

43. A corn harvesting header as claimed in claim 42 wherein said means drivingly connecting the power shaft with the respective transmission means permit slippage when the snapping rolls and the gathering chains jam.

44. A corn harvesting header as claimed in claim 39 wherein said one gathering and snapping unit includes a frame having laterally spaced, forwardly projecting side frame members, a gear housing secured between said side frame members for said gathering chain and snapping roll transmission means, said transmission means including at least one driving member and at least one driven member drivingly connected, said driving member being slidably and non-rotatably engaged with said drive shaft means to transmit drive to said driven member upon rotation of said drive shaft means, said gathering chains and said snapping rolls being supported between said side frame members, and said gathering chains and snapping rolls being engaged through said housing with said transmission means.

45. A corn harvester comprising: a transverse harvesting table; a transverse supporting beam carried by the harvesting table; a plurality of forwardly projecting gathering and snapping units mounted on said beam in laterally spaced relationship; each of said gathering and snapping units including a frame, a pair of cooperable gathering chains mounted on said frame, a pair of cooperable snapping rolls mounted on said frame beneath said gathering chains and transmission means for said gathering chains and snapping rolls carried by said frame; transverse drive shaft means rotatably mounted on said harvesting table in parallel relationship with said beam; said drive shaft means being slidably and drivingly engaged with the transmission means of each of said gathering and snapping units for simultaneously driving all of the gathering chains and snapping rolls; and at least one of said gathering and snapping units being mounted on said beam by clamping means releasable to permit selective adjustment of said one gathering and snapping unit along said beam and drive shaft means without interrupting the driving engagement of said one gathering and snapping unit with said drive shaft means to vary the lateral spacing between said one gathering and snapping unit and adjacent gathering and snapping units.

46. A corn harvester as claimed in claim 45 wherein said drive shaft means is drivingly connected to the respective transmission by means permitting slippage between the drive shaft means and respective transmission when the respective snapping rolls and gathering chains are jammed.

47. A crop harvester on a mobile crop treating unit having transversely spaced traction wheels and a forwardly positioned crop inlet, comprising: a transverse frame including a transverse beam having a plurality of transversely spaced bolt openings positioned forwardly of the crop treating unit; a plurality of fore-and-aft extending and transversely spaced crop harvesting units on the beam adapted to be bolted thereto at a plurality of different transverse positions in accordance with different spacings between adjacent rows of crops, the units being inclined from forward crop receiving ends adjacent the ground to upper transversely spaced rear discharge ends, said beam being beneath the rear discharge ends; a conveyor structure between the inlet of the crop treating unit and harvesting units and discharging into the crop inlet, the conveyor structure including a transverse conveyor having a transverse trough means and auger means therein positioned to receive crops from the transversely spaced discharge ends and being convertible to different widths in accordance with variations in the number of and in the overall transverse expanse of the harvesting units.

48. A crop harvestor on a mobile crop treating unit having transversely spaced traction wheels and a forwardly positioned crop inlet, comprising: a transverse frame including a transverse beam positioned forwardly of the crop treating unit; means on the transverse frame for supporting a plurality of fore-and-aft extending and transversely spaced crop harvesting units on the frame at a plurality of different transverse positions in accordance with different spacings between adjacent rows of crops, the units being inclined from forward crop receiving ends adjacent the ground to upper transversely spaced rear discharge ends, said beam being beneath the rear discharge ends and having at least one square corner at its upper side, and each of the harvesting units being provided with a transverse structure with an overhead and side that engages the cornered portion of the beam; a conveyor structure between the inlet of the crop treating unit and harvesting units and discharging into the crop inlet, the conveyor structure including a transverse conveyor having a transverse trough means and auger means therein positioned to receive crops from the transversely spaced discharge ends and being convertible to different widths in accordance with variations in the number of and in the overall transverse expanse of the harvesting units.

49. The structure as set forth in claim 48 in which the transverse auger trough has its forward upper edge rearwardly of and adjacent the transverse beam and supported thereon.

50. A crop harvester on a mobile crop handling unit having a crop inlet and a main drive means, comprising: a conveyor structure discharging rearwardly into the crop inlet and including a transverse conveyor section extending to opposite sides of and disposed forwardly of the crop handling unit; a plurality of forwardly directed and transversely spaced crop harvesting units, each unit having a forward end adjacent the ground and an upper and rear end adjacent the transverse conveyor section and forward crop gathering and harvesting mechanism effective to harvest crops from a crop row as it advanes; transverse selective means connecting the harvesting units to the conveyor structure adjacent the transverse conveyor section and for adjusting the spacing between the harvesting units to accommodate various spacing between the crop rows, said latter means including a transverse horizontal pivotal support for at least one of said units; a transverse drive shaft supported by the transverse conveyor section; means connecting the drive shaft to the main drive means for effecting rotation of the drive shaft; drive means extending from the drive shaft to each of the harvesting units for operating the respective harvesting mechanisms, said latter drive means being adjustable axially with respect to the transverse drive shaft to accommodate various transverse positions of the harvesting units; and an extensible and retractable hydraulic cylinder anchored at one end and connected at the other end to the respective unit carried on the horizontal pivotal support for raising and lowering the unit.

51. A crop harvester on a mobile crop handling unit having a crop inlet and a main drive means, comprising: a conveyor structure discharging rearwardly into the crop inlet and including a transverse conveyor section extending to opposite sides of and disposed forwardly of the crop handling unit; a plurality of forwardly directed and transversely spaced crop harvesting units, each unit having a forward end adjacent the ground and an upper and rear end adjacent the transverse conveyor section and forward crop gathering and fore-and-aft extending harvesting mechanism effective to harvest crops from a crop row as it advances, each unit further having a fore-and-aft auger conveyor alongside the harvesting mechanism and extending upwardly and rearwardly to a downwardly opening discharge outlet opening into the transverse conveyor section; transverse selective means connecting the harvesting units to the conveyor structure adjacent the transverse conveyor section and for adjusting the spacing between the harvesting units to accommodate various spacing between the crop rows; a transverse drive shaft supported by the transverse conveyor section; means connecting the drive shaft to the main drive means for effecting rotation of the drive shaft; drive means extending from the drive shaft to each of the harvesting units for operating the respective harvesting mechanisms, said latter drive means being adjustable axially with respect to the transverse drive shaft to accommodate various transverse positions of the harvesting units.

52. The crop harvester as set forth in claim 51 in which the auger conveyor includes a trough with an opening in the bottom thereof forming the outlet, and an auger seated in the trough and terminating at its rear end with radial paddle means that drives the harvested crop through the outlet and into the respective conveyor section.

References Cited

UNITED STATES PATENTS

| | | | |
|---|---|---|---|
| 1,390,159 | 9/1921 | Price | 56—106 |
| 3,271,940 | 9/1966 | Ashton et al. | 56—105 |
| 3,520,121 | 7/1970 | Ashton et al. | 56—106 |
| 1,090,150 | 3/1914 | Hibbs | 56—18 |
| 1,936,760 | 11/1933 | Hitchcock | 56—18 |
| 3,101,579 | 8/1963 | Karlsson et al. | 56—18 |

FOREIGN PATENTS

| | | | |
|---|---|---|---|
| 1,268,615 | 6/1961 | France | 56—105 |
| Ad. 79,932 | 1/1963 | France | 56—105 |

ANTONIO F. GUIDA, Primary Examiner

U.S. Cl. X.R.

56—105